United States Patent

[11] 3,602,790

| [72] | Inventor | Robert W. Kearns<br>20524 Rutherford Ave., Detroit, Mich.<br>48235 |
|---|---|---|
| [21] | Appl. No. | 676,206 |
| [22] | Filed | Oct. 18, 1967 |
| [45] | Patented | Aug. 31, 1971 |

[54] INTERMITTENT WINDSHIELD WIPER SYSTEM
19 Claims, 5 Drawing Figs.

[52] U.S. Cl. .................................................. 318/443,
318/361, 318/379
[51] Int. Cl. .............................................. B60s 1/08
[50] Field of Search .............................. 318/361,
443, 444, DIG. 2, 379, 339; 15/250, 12, 250.02

[56] References Cited
UNITED STATES PATENTS

| 3,411,064 | 11/1968 | Mellor | 318/339 |
|---|---|---|---|
| 2,611,116 | 9/1952 | Latta et al. | 318/379 X |
| 2,977,623 | 4/1961 | Schmitz | 15/250.17 X |
| 3,219,901 | 11/1965 | Forman et al. | 318/443 |
| 3,351,836 | 11/1967 | Kearns | 318/443 |
| 3,339,123 | 8/1967 | Riester | 318/443 |
| 2,144,575 | 1/1939 | Murphy | 318/361 |
| 3,262,042 | 7/1966 | Amos | 318/443 |
| 3,310,722 | 3/1967 | Diello | 318/361 |
| 3,335,352 | 8/1967 | Neapolitakis | 318/443 |
| 3,364,410 | 1/1968 | Foreman | 318/443 |
| 3,407,345 | 10/1968 | Fruehauf | 318/443 |

FOREIGN PATENTS

| 1,093,430 | 11/1954 | France | 318/361 UX |
|---|---|---|---|

Primary Examiner—Oris L. Rader
Assistant Examiner—Robert J. Hickey
Attorney—Lane, Aitken, Dunner & Ziems ABSTRACT: This specification discloses windshield wiper systems employing three brush DC motors to drive the windshield wipers. When a three brush motor is energized between one pair of its three brushes it operates at a high speed but will produce relatively low torque and when it is energized between another pair of its three brushes it operates at relatively low speed but will produce a relatively high output torque. The windshield wiper systems herein disclosed energize the motor intermittently between the high speed pair of brushes to operate the wiper blades at high speed intermittently. The systems use the low speed pair of brushes to move the wiper blades to the park position when the system is turned off and brake the motor to a stop by shunting the low speed pair of brushes. Some of the systems have the continuous mode of operation in which the motor is energized continuously between the high speed pair of brushes with speed regulation to maintain the a constant speed of operation.

INVENTOR
Robert W. Kearns

BY
Lane, Aitken, Dunner & Ziems
ATTORNEYS

INVENTOR
Robert W. Kearns

BY Lane, Aitken, Dunner + Ziems
ATTORNEYS

INTERMITTENT WINDSHIELD WIPER SYSTEM

The embodiments of the present inventions disclosed herein are improvements over the systems disclosed in copending application Ser. No. 414,973, filed Dec. 1, 1964, now Pat. No. 3,351,836.

BACKGROUND OF THE INVENTION

This invention relates to windshield wiper systems for automotive vehicles, and more particularly to windshield wiper systems of the intermittent type in which the wipers may be caused to dwell for a selected time interval at the end of each wiper cycle, a wipe cycle being defined as one back and forth movement of the wiper blades across the windshield. In the copending application Ser. No. 414,973, invented by Robert W. Kearns and filed Dec. 1, 1964, now Pat. No. 3,351,836, there is disclosed an intermittent windshield wiper system in which wiper blades may be caused to dwell at the end of each wipe cycle. The embodiments of the present invention are improvements over the systems disclosed in the above-mentioned copending application.

The systems of the present invention employ a three brush motor to drive the wiper blades. By switching the brushes between which the three brush motor is energized or is electrodynamically braked, the characteristics of the motor can be changed. For example, when the motor is energized between one pair of the brushes, the motor will run at a relatively high speed but will produce relatively low output torque. When the motor is energized between a different pair of the brushes, it will run at a lower speed but will produce a higher output torque. Also, when the motor is electrodynamically braked between this latter pair of brushes a greater braking force will be applied to the motor. The systems of the present invention take advantage of these different characteristics which can be selected for the three brush motor.

SUMMARY OF THE INVENTION

In accordance with the present invention, the motor is energized to have the high-speed, low torque characteristics during normal operation of the wiper blades and is energized to have the low-speed, high torque characteristics when the blades are being moved to their park position after they have been turned off and are braked with maximum electrodynamic braking. Because the blades are moved at low speed to their park position and are then braked with maximum electrodynamic braking the wiper blades are precisely in the desired park position. This feature is important because it enables the wiper blades to be brought to rest always near the windshield moulding out of the driver's field of vision. In one embodiment of the invention, the difference in braking characteristics which can be selected is made use of in the intermittent mode of operation to provide automatic skipping of the dwell period at the end of a wipe cycle in response to the wetness of the windshield.

Accordingly, an object of the present invention is to provide improved windshield wiper systems for automotive vehicles;

Another object of the present invention is to provide improved windshield wiper systems for automotive vehicles of the type which operate intermittently with dwell periods at the end of each wipe cycle;

A still further object of the present invention is to provide intermittent type windshield wiper systems making use of a three brush motor to drive the windshield wipers;

Further objects and advantages of the present invention will become readily apparent as the following detailed description of the invention unfolds and when taken in conjunction with the accompanying drawings.

BRIEF DESCRIPTION OF THE DRAWINGS

FIGS. 1 and 4 illustrate embodiments which are designed to have both intermittent and continuous modes of operation. The embodiments of FIGS. 2, 3 and 5 have only the intermittent mode of operation.

DESCRIPTION OF THE PREFERRED EMBODIMENTS

Figure 1:
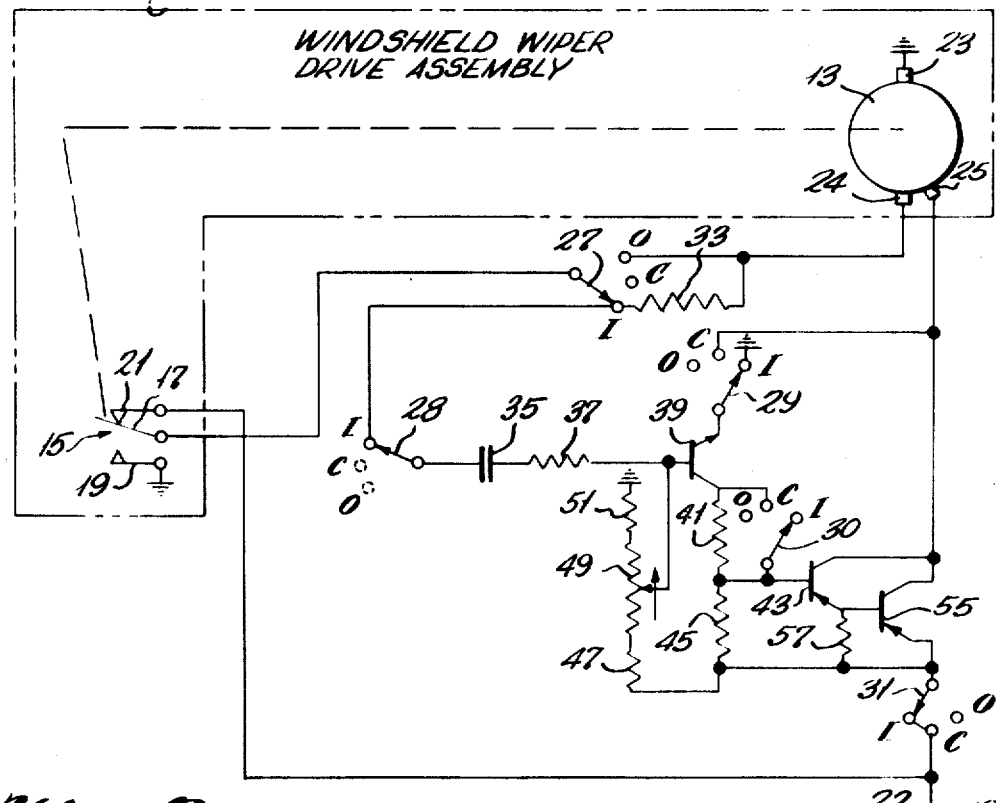
FIGS. 1–5 are circuits illustrating different embodiments of the present invention.

In FIG. 1, the reference number 11 designates the windshield wiper drive assembly, which comprises a DC motor 13 connected to drive windshield wiper blades, not shown, in a conventional manner. The windshield wiper drive assembly 11 also includes a park switch 15, which is operated by the motor 13. The park switch 15 includes a pole 17, a grounded contact 19 and a contact 21 connected to a positive DC source of about 12 volts applied at a terminal 22. The 12 volts is the vehicle battery voltage. Actually when the vehicle is operating, the vehicle generator will usually deliver about 14 volts to the terminal 22. The pole 17 will engage the contact 19 when the wiper blades are in or near their park position and will engage the contact 21 throughout the rest of the wipe cycle of the wiper blades.

The motor 13 has three brushes 23, 24 and 25. When the motor is energized between the brushes 23 and 24, the entire armature of the motor will be fully energized and the motor will run at low speed but will produce a high output torque. When the motor is energized between the brushes 23 and 25, only part of the armature of the motor is energized and the motor 13 will run at a significantly higher speed but will produce a lower output torque. Accordingly, the brush 24 is referred to as the low-speed brush and the brush 25 is referred to as the high-speed brush. The brush 23 of the motor 13 is connected to ground. The motor will operate at a higher speed when energized from the brush 25 than it will when energized from the brush 24 because only part of the back EMF generated by the armature will appear between the brushes 23 and 25 and accordingly the motor must run at a faster speed to increase the back EMF to a point at which it together with the IR drop across the armature resistance equals the applied voltage. On the other hand, as pointed out above, the motor will not produce as much output torque when energized between the brushes 23 and 25 as it will when energized between brushes 23 and 24. In windshield wiper applications, the motor under ordinary operating conditions is not required to produce a high torque so the reduced torque when energized from the low-speed brush 25 is not a problem.

The control circuit of the system shown in FIG. 1 will operate the windshield wiper drive assembly in two different modes, continuous and intermittent. In the continuous mode of operation, the motor drives the wiper blades continuously at a speed which is selectively variable. In the intermittent mode of operation, the motor 13 drives the wiper blade intermittently, dwelling for a selectively variable time interval in the park position at the end of each wipe cycle of the wiper blades. The mode of operation is controlled by ganged switches 27–31, which have three positions; an intermittent position in which the wiper blades are driven in the intermittent mode as discussed above; a continuous position in which the wiper blades are driven in the continuous mode as discussed above, and an off position in which the wiper blades are driven to the park position and stopped.

The pole of the switch 27 is connected to the pole 17 of the switch 15 and in the off position the pole 27 connects the pole 17 to the low-speed brush 24. In the continuous position, the pole 27 leaves the pole 17 disconnected from the circuit and in the intermittent position, the pole 27 connects the pole 17 to one side of a 1-ohm resistor 33, the other side of which is connected to the low-speed brush 24. The resistor 33 preferably is in the form of coils of resistance wire. The pole of the switch 28 is connected to one side of a 1,000-microfarad capacitor 35 and in the intermittent position the switch 28 connects the capacitor 35 to the pole 17 of the park switch through the switch 27. In the continuous and in the off positions the switch 28 leaves the capacitor 35 disconnected. The capacitor is connected in series with a 390-ohm resistor 37 between the pole of the switch 28 and the base of an NPN transistor 39. The emitter of the transistor 39 is connected to the pole of the switch 29, which connects the emitter of the transistor 39 to ground when the switch 29 is in the intermittent position and connects the emitter of the transistor 39 to the high-speed brush 25 when in the continuous position. The switch 29 leaves the emitter of the transistor 39 disconnected in the off position. The collector of the transistor 39 is connected through a 270-ohm resistor 41 to the base of a PNP transistor 43. In the continuous position, the switch 30 shunts out the resistor 41. The switch 30 is open in the intermittent and off positions. The resistor 41 is connected in series with a 56-ohm resistor 45 between the pole of the switch 31 and the collector of the transistor 39. The pole of the switch 31 is also connected through a series circuit of a 470-ohm resistor 47, a 10-kilohm potentiometer 49 and a 39-kilohm resistor 51 to ground. The movable tap of the potentiometer is connected to the base of the transistor 39. In the intermittent and the continuous positions the pole of the switch 31 connects to the plus volts applied at terminal 22 and in the off position, the switch 31 is open. The emitter of the transistor 43 is connected to the base of a PNP transistor 55, the collector of which is connected to the collector of the transistor 43 and to the high-speed brush 25. The emitter of the transistor 43 is connected through 5.6-ohm resistor 57 to the emitter of the transistor 55 and to the pole of the switch 31.

When the system of FIG. 1 is operating in the intermittent mode, the poles of the switches 27–31 will be in the position in which they are shown in FIG. 1 engaging the contacts designated by the letter I. Accordingly, the capacitor 35 and the resistor 37 will be connected in series between the pole 17 of the park switch and the base of the transistor 39. The resistor 33 will be connected between the low-speed brush 24 and the pole 17 of the park switch 15. The emitter of the transistor 39 will be connected to ground and the resistor 41 will not be shorted by the switch 30. The switch 31 will connect to plus 12 volts. When the motor 13 is driving the wiper blade in the intermittent mode, the transistors 39, 43 and 55 will be conducting and the motor 13 will be energized through the high-speed brush 25. One side of the capacitor 35 will have plus 12 volts applied thereto through the pole 17 of the park switch, which will be in engagement with contact 21. The other side of the capacitor 35 will have a potential near ground applied thereto as a result of the conduction of the transistor 39.

When the wiper blades reach the park position, the pole 17 will disengage the contact 21 and engage the contact 19 causing ground to be applied to the side of the capacitor 35 connected to the park switch. This drop in potential from plus 12 volts to ground applied to one side of the capacitor 35 will cause the same drop in the potential to occur on the other side of the capacitor 35 and accordingly the other side of the capacitor 35 will suddenly change to minus 12 volts when the wiper blades come into the park position. As a result a minus voltage will be applied to the base of the transistor 39 causing the transistor 39 to turn off. When the transistor 39 turns off, current will stop flowing through the resistors 41 and 45 thus causing the potential at the base of the transistor 43 to rise. Accordingly the transistor 43 will turn off causing the transistor 55 in turn to also turn off. As a result, current will stop flowing through the high-speed brush 25 of the motor 13. Also, when the pole 17 of the park switch engages the contact 19 as the wiper blades come into the park position, the resistor 33 will be connected between the low-speed brush 24 and the brush 23 so that the motor 13 will be electrodynamically braked through the resistor 33. The electrodynamic braking of the motor 13 will bring the motor quickly to a stop after the wiper blades come into the park position. Thus, it will be seen that the motor in the intermittent mode is driven through the high-speed brush achieving a high-speed wipe and yet is braked through the low-speed brush. Braking through the low-speed brush rather than through the high-speed brush provides greater braking of the motor since the full back EMF generated by the armature is used to generate the electrodynamic braking current, whereas if the motor were braked by connecting a resistor between the high-speed brush 25 and the brush 23 only part of the back EMF generated by the motor would be used to generate the braking current and thus would provide less braking.

After the motor has been stopped by the electrodynamic braking action, the capacitor 35 will begin to charge through the resistor 47, the potentiometer 49 and the resistor 37. As a result, the potential at the base of the transistor 39 will begin to rise until it reaches a point at which the transistor 39 is turned on. When the transistor 39 begins to conduct, current will flow through the resistor 41 from the base of the transistor 43 rendering the transistor 43 conductive, which in turn will render the transistor 55 conductive. Accordingly, the motor 13 will be again energized through the high-speed brush 25. Current will flow through the brush 25 to the brush 23 and to the brush 24 since the brush 24 will be connected to ground through the resistor 33 and the pole of the switch 15. The current flowing from the brush 25 to the brush 24 will in effect be trying to drive the motor in the opposite direction from the current flowing from the brush 25 to the brush 23. However, because of the resistor 33, much greater current will be flowing from the brush 25 to the brush 23 and accordingly this current will cause the motor to start driving the wiper blades in the correct direction. As soon as the wiper blades are moved a short distance, the pole 17 will disengage from the contact 19 and will engage the contact 21 so that plus 12 volts will be applied to the pole 17. Accordingly, reverse current will no longer flow between the brushes 24 and 25 and the energization of the motor through the high-speed brush will cause the motor 13 again to drive the wiper blades at a high speed and the cycle is repeated. The length of time that the wiper blades stop after reaching the park position is determined by how long it takes the capacitor to charge through the resistor 47, the potentiometer 49 and the resistor 37 and this time in turn depends upon the setting of the potentiometer 49. Accordingly, the dwell period following each wipe cycle can be varied by varying the position of the movable tap of the potentiometer 49.

In this manner, in the intermittent mode the wiper blades are driven at high speed and then are caused to dwell after each successive wiping cycle. Because of the high-speed wipe cycles and the dwell period at the end of each wipe cycle, the wiper blade action is similar to an eye blink and thus greatly reduces the distractive influence of the wiper blades on the driver.

In the continuous mode of operation, the ganged switches 28–31 are moved to the continuous position in which the poles engage the contacts identified by the letter C. In this position, the park switch 15, the resistor 33, the capacitor 35 and the resistor 37 are effectively disconnected from the circuit. Also, the resistor 41 is shorted out. The emitter of the transistor 39, instead of being connected to ground, is connected to the high-speed brush 25. Accordingly, the motor will be energized through the high-speed brush by the conduction of the transistors 43 and 55. The speed at which the motor is driven will be controlled by the setting of the potentiometer 49, which controls the conduction of the transistor 39. The transistor 39 in turn controls the conduction of the transistors 43 and 55. The speed at which the motor 13 drives the windshield wiper blades will be regulated to be relatively constant as any change in the speed of the wiper blades will cause a change in the back EMF generated by the motor, which change will result in a change of the potential at the high-speed brush 25. The transistor 39 acts to compare the voltage at the high-speed brush with the reference voltage provided at the tap of the potentiometer and any change in potential at the high-speed brush will be amplified by the transistor 39 and the transistors 43 and 55, and will be fed back to the high-speed brush to counteract the change in potential. Thus, a high gain feedback loop is provided to maintain the potential at the high-speed brush constant and thus maintain the motor speed constant. If the motor speed should start to decrease as a result of an increased load upon the wiper blades, the voltage at the high-speed brush will start to drop thus causing an increase in the emitter to base voltage of the transistor 39 increasing the conduction through the resistor 39. Increased conduction through the transistor 39 will cause an increased conduction through the transistor 43. The increased conduction through the transistor 43 will cause increased conduction through the transistor 55 thus supplying increased current through the armature of the motor 13 to counteract the increased load and the tendency of the motor 13 to slow down. When the load on the motor 13 is decreased causing the speed of the motor 13 to tend to start to increase, the opposite effect will occur so that the speed of the motor 13 is maintained relatively constant at a value determined by the setting of the potentiometer 49.

When the ganged switches 27-31 are moved to the off position, the emitter of the transistor 29 will be disconnected and accordingly the transistors 43 and 55 will be cut off. The motor 13 however will be energized through the high-speed brush as a result of the switch 27 connecting the low-speed brush to the pole 17 of the park switch. As a result, the motor 13 will drive the wiper blades at a low speed until the wiper blades reach the park position at which the low-speed brush 24 will be connected to ground thus applying a direct short across the motor 13. As a result, full electrodynamic braking will be applied to the motor 13 bringing the motor to a stop precisely at the point at which the wiper blades reach the desired park position. Precise positioning is achieved because the wiper blades are driven to their park position at low speed so that they have low inertia and maximum electrodynamic braking is provided by the direct short between the low-speed brush 24 and ground when the wiper blades arrive at the park position.

In accordance with another aspect of the present invention, in the intermittent mode of operation, the dwell period may be automatically skipped at the end of each wipe cycle depending upon the wetness of the windshield. When such a feature is provided in the system of FIG. 1, the resistor 33 is made larger to reduce the electrodynamic braking on the motor to stop the wiper blades for the dwell period at the end of each wipe cycle. When the windshield is relatively wet, the braking in the wiper blades will be reduced and accordingly the wiper blades will be driven at a higher speed through the wipe cycle. As a result, the wiper blades will have greater momentum when they arrive at the park position. With the value of the resistor 33 properly selected, the electrodynamic braking force applied to the motor when the pole 17 engages the contact 19 will not be enough to overcome the momentum of the wiper blades and bring the wiper blades to a stop before the pole 17 moves out of engagement with the contact 19 and again engages contact 21. Accordingly, the voltage on the capacitor will switch back to turn the transistors 39, 43 and 55 on again and the wiper blades will be driven through another wipe cycle. Thus, the dwell period will be skipped when the windshield is relatively wet. On the other hand, if the windshield is relatively dry the braking action of the windshield on the wiper blades will be greater and accordingly the wiper blades will be driven at a lower speed. When the value of the resistor 33 properly selected, the electrodynamic braking action will be sufficient to overcome the lower momentum of the wiper blades and stop the wiper blades near the park position for a dwell period at the end of each wipe cycle. Thus, the dwell period will be automatically skipped in the intermittent mode in response to a predetermined degree of wetness on the windshield.

Figure 2:
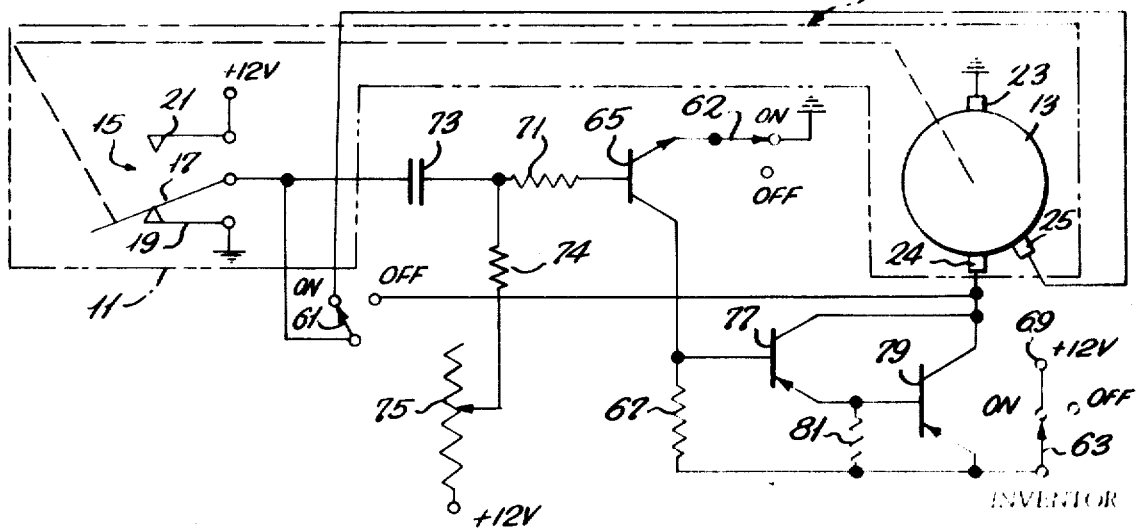

The embodiment shown in FIG. 2 is simpler than that shown in FIG. 1 in that it only has one mode of operation, intermittent. If in this embodiment the windshield wipers are to be operated continuously, the control is adjusted to reduce the dwell at the end of each wiping cycle until it is negligible and continuous operation results. In the embodiment in FIG. 2 the windshield wiper drive assembly is the same as that in FIG. 1 and accordingly the same reference numbers are used to designate the unit generally and the parts thereof comprising the motor 13 and the park switch 15. As in the windshield wiper drive assembly in FIG. 1, the contact 19, which is engaged by the pole 17 when the wipers are in the park position, is connected to ground and the contact 21, which is engaged by the pole 17 during the wipe cycle, is connected to plus 12 volts. As in the assembly 11 in FIG. 1, the brush 23 of the motor 13 is connected to ground.

The system of FIG. 2 has three ganged control switches 61, 62 and 63 which just have two positions, on and off. When the switches 61 through 63 are in the on position, the motor 13 may drive the windshield wipers intermittently with a dwell period at the end of each wiping cycle when the wiper blades arrive at their park position. The system of FIG. 2 also provides for automatic skipping of the dwell period in response to a predetermined degree of wetness on the windshield. As pointed out above, the windshield wipers can be operated continuously by adjusting the dwell period down until it is a negligible dwell. When the switches 61 through 63 are turned to the off position, the motor 13 will be energized to drive the wiper blades to their park position where the motor will be braked to a stop.

The pole of the switch 61 is connected to the pole 17 of the park switch. In the on position, the switch 61 will connect the pole 17 of the park switch to the high-speed brush 25 of the motor 13 and in the off position, the switch 61 will connect the pole 17 of the park switch to the low-speed brush 24. The pole of the switch 62 is connected to the emitter of an NPN transistor 65. In the on position, the switch 62 connects the emitter of the transistor 65 to ground, and in the off position, the switch 62 leaves the emitter of the transistor 65 disconnected. The collector of the transistor 65 is connected through a resistor 67 to the pole of the switch 63. When the switch 63 is in its on position it connects to a source of plus 12 volts applied at a terminal 69. When the switch 63 is in its off position, it is open. The base of the transistor 65 is connected through a resistor 71 and a capacitor 73 in series to the pole 17 of the park switch. The junction between the capacitor 73 and the resistor 71 is connected through a resistor 74 to the movable tap of a potentiometer 75, one end of which is connected to plus 12 volts and the other end of which is unconnected. The collector of the transistor 65 is connected to the base of a PNP transistor 77, the emitter of which is connected to the base of a PNP transistor 79. The collectors of the transistors 77 and 79 are connected together and to the low-speed brush 24. The emitter of the transistor 77 is connected through a resistor 81 to the emitter of the transistor 79 and to the pole of the switch 63.

When the switches 61-63 are in their off position and the wiper blades are in their park position, the pole 17 will engage the contact 19. Accordingly, one side of the capacitor 73 will be connected to ground. The other side of the capacitor 73 will be charged to plus 12 volts through the potentiometer 75. The transistor 65 however will be turned off because the emitter of the transistor 65 will be disconnected. The emitters of the transistors 77 and 79 will also be disconnected from the plus 12 volts at terminal 69 and these transistors will also be turned off.

When the switches 61-63 are moved to their on position, in which they are shown in FIG. 2, the 12 volts charge on the capacitor 73 will turn the transistor 65 on and the resulting conduction through the base of transistor 77 will turn the transistor 75 and 79 on so that plus 12 volts will be applied to the low-speed brush 24. The armature will be shorted from the high-speed brush 25 to the brush 23 but the current flowing from the low-speed brush to the high-speed brush 25 will be sufficient to get the motor moving so that the wiper blades move far enough for the pole 17 to come into contact with the contact 21, whereupon 12 volts will be applied to the high-speed brush 25. When the 12 volts are applied to the high-speed brush 25, the motor 13 will drive the wiper blades through a wipe cycle at high speed.

At the completion of the wipe cycle when the wiper blades arrive at the park position, the pole 17 of the park switch will engage the contact 19 causing the portion of the armature between the brushes 23 and 25 to be shorted out, thus applying electrodynamic braking to the motor 13. While the motor is being driven through the wipe cycle, the 12 volts on the capacitor 73 will discharge through the conducting transistor 65 so that when the wiper blades get back to the park position, the side of the capacitor 73 connected to the transistor 65 will be near ground potential. The other side of the capacitor 73 will be connected to plus 12 volts during the wipe cycle as a result of the pole 17 of the park switch engaging the contact 21. Accordingly, the side of the capacitor connected to the park switch will be at plus 12 volts when the wiper blades arrive at the park position. When the pole 17 of the switch 15 engages the contact 19 upon the arrival of the wiper blades at the park position, the side of the capacitor 73 connected to the park switch will suddenly be driven to ground potential. As a result the side of the capacitor 73 connected to the transistor 65 will drop from ground to minus 12 volts causing the transistor 65 to be turned off. Accordingly, the transistors 77 and 79 will be turned off and as a result no current will be applied to the low-speed brush 24 of the motor 13.

If the windshield upon which the wipers are operating is relatively wet, the windshield wiper blades will have a high momentum when they come into the park position and this momentum will overcome the electrodynamic braking force applied to the motor 13 and cause the motor 13 to move past the region in which the pole 17 engages the contact 19. Accordingly, the pole 17 will again engage the contact 21 so that the wiping process proceeds without dwell on a relatively wet windshield. On the other hand if the windshield is relatively dry so that the wiper blades come into the park position with lower momentum because of the braking action of the windshield itself on the wiper blades, the inertia of the wiper blades will not be sufficient to overcome the electrodynamic braking force applied by the shorting between the high-speed brush 25 and the brush 23 and the wiper blades will be brought to a stop at the end of the wipe cycle.

After the wiper blades have been brought to a stop, the capacitor 73 will begin to charge through the potentiometer 75 from the plus 12 volts applied thereto. When the charge on the capacitor rises sufficiently, the transistor 65 will turn on, which action in turn will cause the transistors 77 and 79 to be turned on. Thus, plus 12 volts will be applied to the low-speed brush 24. Accordingly, the motor 13 will then be driven out of the region in which the pole 17 engages the contact 19 and the pole 17 will engage the contact 21 whereupon 12 volts again will be applied to the high-speed brush 25. The wiper motor 13 will then complete another wipe cycle and the process will be repeated.

The length of time that the wiper blades dwell at the end of each wipe cycle depends upon the length of time it takes the capacitor 73 to charge to a value sufficient to turn the transistor 65 on and this time interval in turn is determined by the setting of the movable tap of the potentiometer 75. In this manner, the length of dwell at the end of each wipe cycle can be selected by setting the movable tap of the potentiometer 75. Thus, when the circuit of FIG. 2 is turned on, the wiper blades will either dwell for a selected time interval at the end of each cycle or will skip the dwell period if the windshield is very wet and causing the windshield wiper blades to come into the park position with sufficient momentum to cause them to pass through the region in which the pole 17 of the park switch engages the contact 19. Accordingly, the windshield wipers will only dwell when such dwell is needed, that is when moisture is not being accumulated on the windshield at a rapid rate requiring the windshield wipers to be run continuously. The operator can adjust the windshield wipers to run continuously simply by adjusting the movable tap of the potentiometer to be near the end connected to the plus 12 volts so that the length of dwell at the end of each wipe cycle is reduced to be negligible.

When the windshield wipers are turned off by moving the switches 61–63 to their off position, plus 12 volts will be applied to the low-speed brush 24 through the switch 61 and through the pole 17 of the switch 15, which will be in engagement with the contact 21. As a result, the motor 13 will drive the windshield wipers at low speed until the windshield wipers come into their park position at which time ground will be applied to the low-speed brush through the park switch. Thus, the armature winding of the motor 13 will be shorted out and full electrodynamic braking will be applied to the motor 13. This braking force will be greater than the braking force applied by the short between the high-speed brush 25 and the brush 23 since the full back EMF of the motor 13 will be used to generate the braking current. Also, the wiper blades will be moving at a slower speed due to the fact that they are being driven from the low-speed brush. As a result of the higher braking force and the lower speed of the wiper blades, the wiper blades will be brought to a stop precisely at the park position regardless of the condition of the windshield and there will be no possibility of the momentum of the wiper blades carrying the wiper blades through the region in which the pole 17 engages the contact 19 so that positive stopping is assured. In this manner, the system of FIG. 2 takes advantage of the lower electrodynamic braking and higher speed of operation provided by use of the brushes 23 and 25 to provide automatic skipping of the dwell period in response to the degree of wetness of the windshield.

Figure 3:
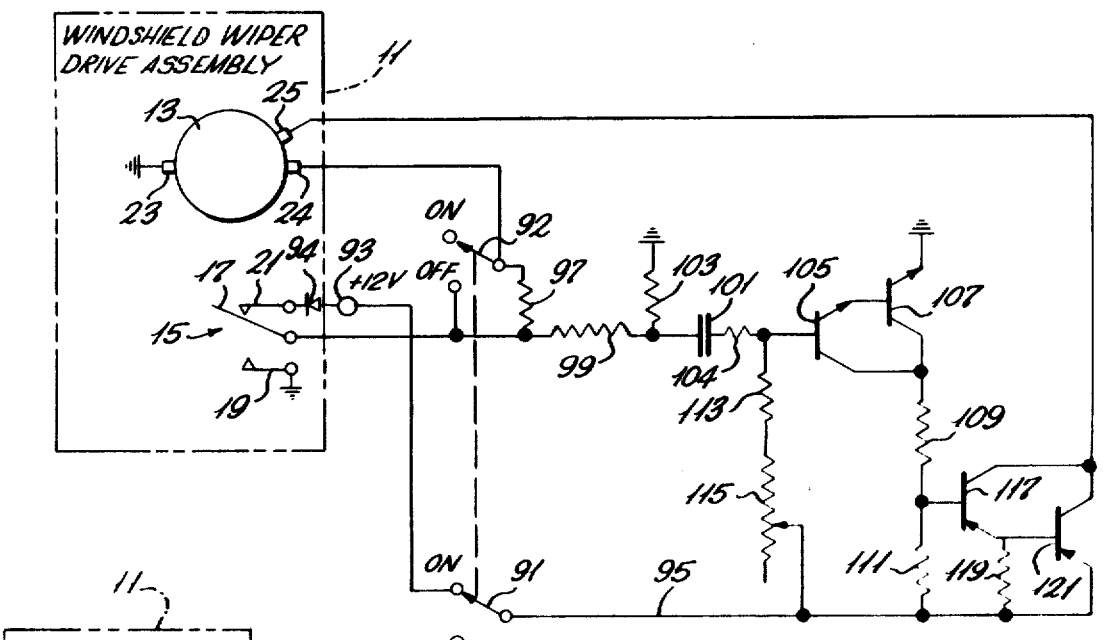

The embodiment of FIG. 3 like that of FIG. 2 has only the intermittent mode of operation. This system can be adjusted so that the dwell at the end of each wipe cycle is reduced to zero to provide continuous operation. In this embodiment the windshield wiper drive assembly is the same as in the embodiments of FIGS. 1 and 2 so the same reference numerals have been applied to the parts of the drive assembly. The system of FIG. 3 is controlled by two ganged switches 91 and 92 having two positions, on and off. When the switches 91 and 92 are in their on position, the motor 13 will drive the windshield wipers intermittently with a dwell period at the end of each wipe cycle. When the switches 91 and 92 are in their off position, the windshield wiper 13 will drive the windshield wipers to the park position at which the windshield wipers will be brought to a stop.

In the on position, the switch 91 connects plus 12 volts applied to a terminal 93 to a conductor 95. In the off position the switch 91 disconnects the 12 volts from the conductor 95. The 12 volts at terminal 93 are applied to the contact 21 of the park switch 15 through a diode 94 and the contact 19 of the park switch 15 is connected to ground. A 1-ohm resistor 97 is connected between the low-speed brush 24 of the motor 13 and the pole 17 of the park switch. This resistor 97 preferably is made of turns of resistance wire. The brush 23 of the motor 13 as in the other embodiments is connected to ground. When the switch 92 is in its off position it shorts out the resistor 97 and when the switch 92 is in its on position it opens the shunt across the resistor 97. The pole 17 of the park switch 15 is connected through a 680-ohm resistor 99 to one side of a 50-microfarad capacitor 101, which is connected to ground through a 1,200-ohm resistor 103. The other side of the capacitor 101 is connected through a resistor 104 to the base of an NPN transistor 105, the emitter of which is connected to the base of an NPN transistor 107. The emitter of the transistor 107 is connected to ground. The collectors of the transistors 105 and 107 are connected together and through a series circuit of 120-ohm resistor 109 and a 10-ohm resistor 111 to the conductor 95. The base of the transistor 105 is connected through a 5.6-kilohm resistor 113 to one side of the potentiometer 115, the movable tap of which is connected to the conductor 95. The other side of the potentiometer 115 is unconnected. The junction between the resistors 109 and 111 is connected to the base of a PNP transistor 117, the emitter of which is connected to the conductor 95 through a 5.6-ohm resistor 119. The emitter of the transistor 117 is connected to the base of a PNP transistor 121, the emitter of which is connected directly to the conductor 95. The collectors of the transistors 117 and 121 are connected together and to the high-speed brush 25 of the motor 13.

When the wiper blades are in their park position and the switches 91 and 92 are in their off position both sides of the capacitor 101 will be at ground potential as the 12 volts applied at terminal 93 will be disconnected from the circuit.

When the switches 91 and 92 are moved to their on position, plus 12 volts will be applied to the conductor 95 and the capacitor 101 will begin to charge through the potentiometer 115 and the resistor 113. Before the capacitor becomes charged the transistors 105 and 107 will remain nonconducting due to the low potential applied by the capacitor 101 to the base of the transistor 105. Accordingly, the transistors 117 and 121 will be nonconducting so that no current will flow into the high-speed brush 25. When the capacitor 101 becomes sufficiently charged, the transistor 105 and accordingly the transistor 107 will turn on thus causing current flow through the resistors 109 and 111. There is very little delay before the transistors 105 and 107 turn on because the base of the transistor 105 needs only to reach 1.4 volts before it turns on. The resulting drop of potential at the base of the transistor 117 will cause the transistors 117 to 121 to be turned on causing 12 volts to be applied to the high-speed brush 25. Accordingly, the motor 13 will begin to drive the wiper blades. As the wiper blades begin to move, the pole 17 will disengage contact 19 and engage the contact 21 whereupon the plus 12 volts applied to terminal 25 will drive the motor at high speed through a wipe cycle. After the pole 17 engages the contact 21, the plus 12 volts at terminal 93 will be applied through the resistor 99 to the capacitor 101 and charge the side of the capacitor 101 connected to the pole 17 to a positive value. The other side of the capacitor 101 will discharge through the conducting transistors 105 and 107 to ground potential.

The motor 13 will continue to drive the wiper blades at a high speed through a wipe cycle, at the end of which the pole 17 will move out of engagement with the contact 21 and will engage the contact 19 thus applying ground to the capacitor 101 through the resistor 99. The resulting sudden drop in potential on the side of the capacitor connected to the pole 17 will cause a corresponding drop in potential on the other side of the capacitor 101 and thus drive the other side of the capacitor 101 and the base of the transistor 105 connected thereto to a negative voltage. This negative voltage will turn transistors 105 and 107 off, which action will turn the transistors 117 and 121 off so that power is no longer applied to the high-speed brush 25. When the pole 17 of the park switch engages the contact 19, the resistor 97 will be connected between the brushes 23 and 24 and electrodynamic braking generated by the full back EMF of the armature will be applied to the motor bringing the motor to a stop at the end of the wipe cycle. The wiper blades remain stationary until the capacitor 101 is again charged up sufficiently to turn the transistors 105 and 107 on again whereupon the motor 13 will commence another wipe cycle and the process will be repeated. The duration of the dwell period at the end of each wipe cycle can be adjusted by adjusting the position of the movable tap on the potentiometer 115.

It will be noted that the circuit of FIG. 3 uses four transistors instead of the three used in the embodiments of FIGS. 1 and 2. This enables a smaller less expensive capacitor to be used in the circuit. The transistors 105 and 107 are of a type of which the maximum back voltage drop from emitter to base is 5 volts. Accordingly, the maximum back voltage from the emitter of the transistor 107 of the base of the transistor 105 is 10 volts. Because of this limitation in transistors 105 and 107 the resistor 103 is used. The resistor 103 acts with resistor 99 as a voltage divider to limit the charge on the side of the capacitor connected to the pole 17 to just less than plus 10 volts when the pole 17 is in engagement with the contact 21. Then when the wiper blades reach the park position and the pole 17 engages the contact 19 the voltage on the opposite side of the capacitor 101 will drop to just less than minus 10 volts and accordingly the maximum back base-to-emitter voltage applied to the transistors 105 and 107 will be less than 5 volts. The resistor 99 also serves to limit the current flowing into the base of the transistor 105. The resistor 113 limits the maximum current through the potentiometer 115 to prevent it from burning out. The diode 94 serves to prevent recirculating current generated by the back EMF produced between brushes 24 and 25 when the motor is being energized from the high-speed brush 24. Such recirculating current would dissipate power in the brake resistor 97 and would reduce the speed of the motor. The diode 14 does not interfere with normal charging of the capacitor or the electrodynamic braking of the motor when such braking is desired. The lack of the diode would not degrade the operation of the circuit substantially and it can be replaced by a direct connection.

When the switches 91 and 92 are moved to the off position, the plus 12 volts will be disconnected from the conductor 95 so that plus 12 volts will no longer be applied to the high-speed brush. The plus 12 volts however will be applied to the low-speed brush directly through the switch 92 from the contact 21 and the pole 17 of the park switch 15. Accordingly, the wiper blades will be driven at low speed to their park position where the pole 17 will engage the contact 19. When the pole 17 engages the contact 19, ground will be applied to both brushes 23 and 24 and full electrodynamic braking will be applied to the motor bringing it to a stop precisely at the park position. Thus, with this circuit as in the circuits in FIGS. 1 and 2 the motor runs at low speed to the park position where maximum braking is applied so that the wiper blades are stopped precisely in the desired position.

If it is desired for the circuit of FIG. 3 to have a dwell skip feature in which the dwell period is automatically skipped when the windshield is relatively wet, the value of the resistor 97 is increased to reduce the electrodynamic braking applied to bring the motor 13 to a stop at the end of each wipe cycle. With the electrodynamic braking reduced the wiper blades will have sufficient momentum as a result of wiping over a relatively wet windshield to pass through the region in which the pole 17 engages the contact 19 before the braking can bring the motor to a stop and accordingly will start another wipe cycle without a dwell period. When it is desired to operate the system of FIG. 3 continuously the movable tap of the potentiometer is moved towards the end connected to the base of the transistor 105 to reduce the dwell period to a negligible amount so for all practicable purposes the wiper blades will operate continuously with no dwell period between each wipe cycle.

The value of the resistor 104 is selected relative to the value of the resistor 113 so that when the movable tap of the potentiometer is adjusted to the upper end of the potentiometer, current will continue to flow in the base of the transistor 105 when the pole 17 of the park switch disengages contact 21 and engages contact 19. Accordingly, the transistor 121 will continue to conduct without any dwell. Thus, the circuit can be adjusted to zero dwell, although there still will be braking of the motor by current flowing through the braking resistor 97 each time the pole 17 engages the contact 19.

Figure 4:
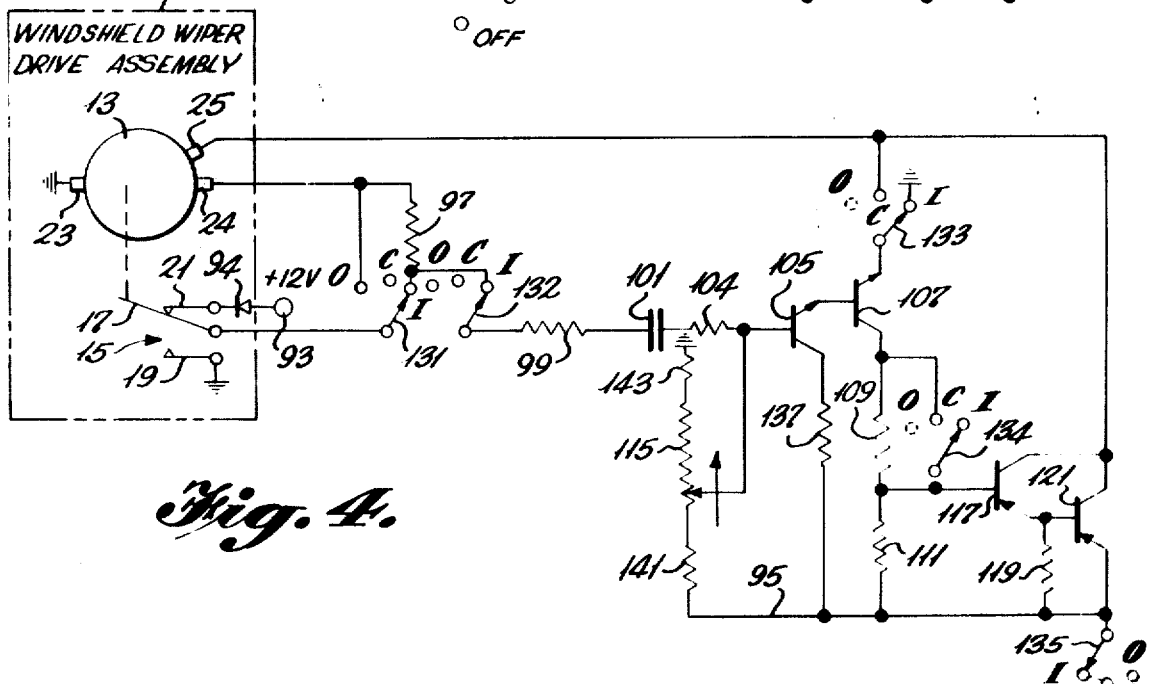

The embodiment of FIG. 4 is similar to that of FIG. 3 except that it has been designed to have, in addition to the intermittent mode of operation, a continuous mode of operation, in which the wiper blades wipe continuously at a speed selected by the operator. In this embodiment five ganged switches 131–135 are required having three positions, off, intermittent and continuous. In the intermittent position the circuit will drive the motor in an intermittent mode with dwell periods at the end of each wipe cycle as in the circuit of FIG. 3. In the continuous position the circuit will drive the motor continuously at a speed selected by the operator, and in the off position the motor 13 will drive the wiper blades to the park position where the blades will be stopped and the motor 13 will be deenergized. The windshield wiper drive assembly is the same as that of the embodiments of FIGS. 1, 2 and 3 and accordingly the same reference numbers have been applied to the parts thereof.

In the intermittent mode of operation and when the circuit is turned off, the circuit of FIG. 4 is very similar to that of FIG. 3 and accordingly corresponding circuit parts have been given the same reference numbers. The circuit of FIG. 4 differs from that of FIG. 3 in that the collector of the transistor 105 instead of being connected to the collector of the transistor 107 is connected to the conductor 95 through a 4.7-kilohm resistor 137. The switch 131 serves the same function as the switch 92 in the circuit of FIG. 3 connecting the brush 24 directly to the pole 17 in the off position and connecting the brush 24 to the pole 17 through the resistor 97 in the intermittent position. In the continuous position the switch 131 leaves the pole 17 disconnected. The switch 135 in the embodiment of FIG. 4 serves the same function as the switch 91 in FIG. 3 and connects the conductor 95 to plus 12 volts applied at a terminal 139 in the intermittent mode of operation and disconnects the conductor 95 from the plus 12 volts of the off position. In the continuous position the switch 135 also connects the conductor 95 to the plus 12 volts at terminal 139. The potentiometer 115 is also connected into the circuit in a little different manner. In the circuit of FIG. 4 one end of the potentiometer 115 is connected to the conductor 95 through a 5.6-kilohm resistor 141 and the other end of the potentiometer 115 is connected to ground through an 870 -kilohm resistor 143. The movable tap of the potentiometer 115 is connected to the base of the transistor 105.

In the intermittent mode of operation and when the switches 131–135 are turned to their off position, the circuit of FIG. 4 operates substantially in the same manner as the circuit of FIG. 3 and accordingly these functions of the circuit will not be described in detail with respect to FIG. 4. When the switches 131 through 135 are moved to their continuous position designated by the letter C in FIG. 4, the circuit of FIG. 4 will drive the motor at a speed selected by the operator. The speed at which the motor is driven will be determined by the setting of the potentiometer and the speed will be regulated to be constant for varying loads on the windshield wipers. In the continuous mode the motor 13 will be energized through the high-speed brush by the conduction of the transistors 117 and 121. In this mode of operation the conduction of the transistor 105 is controlled by the setting of the potentiometer 115 and this conduction in turn controls the conduction of the transistors 117 and 121 through the transistor 107. In this manner the speed of the motor is controlled by the setting of the potentiometer. The speed of the motor is maintained relatively constant by means of a high gain feedback loop similar to that described with reference to FIG. 1. If the load on the wiper blade should increase tending to cause the speed of the wiper blades to decrease and thus decrease the speed of the motor 13, the back EMF generated at the high-speed brush 25 will tend to drop. The resulting drop in potential at the brush 25 will be transmitted through the switch 133 to the emitter of the transistor 107, thus increasing the base to emitter voltage of this transistor and increasing the conduction through the transistor 107. Accordingly, the potential applied to the base of the transistor 117 would decrease and the conduction through the transistors 117 and 121 would increase thus applying more current to the high-speed brush 25 to counteract the increase in load. In a similar manner when the load on the wiper blades has decreased tending to cause an increase in the speed of the motor 13, the resulting increase in the back EMF at the high-speed brush will cause the decrease in the conduction through the transistors 117 and 121 and thus counteract the decrease and load on the wiper blades to maintain a constant speed. In this manner, the speed of the motor is regulated to be constant with varying loads.

The switch 134 is employed to short out the resistor 109 in the continuous position so as to permit higher speed operation in the continuous mode. The speed at which the motor operates depends upon the voltage drop across the transistor 121. The lower this voltage drop is, the higher the voltage applied to the high-speed brush will be and the higher the motor speed will be. The resistor 109 would contribute to a larger than necessary drop across the transistor 121 in the continuous mode so its being shorted out permits high-speed operation. In addition the change from the circuit of FIG. 3 in the connection of the collector circuit of transistor 105 prevents the voltage drop across he transistor 105 from adding to the voltage drop across the transistor 121 in the continuous mode and therefore provides for higher speed operation in the continuous mode. It also reduces power dissipation in transistors 105 and 107.

Figure 5:
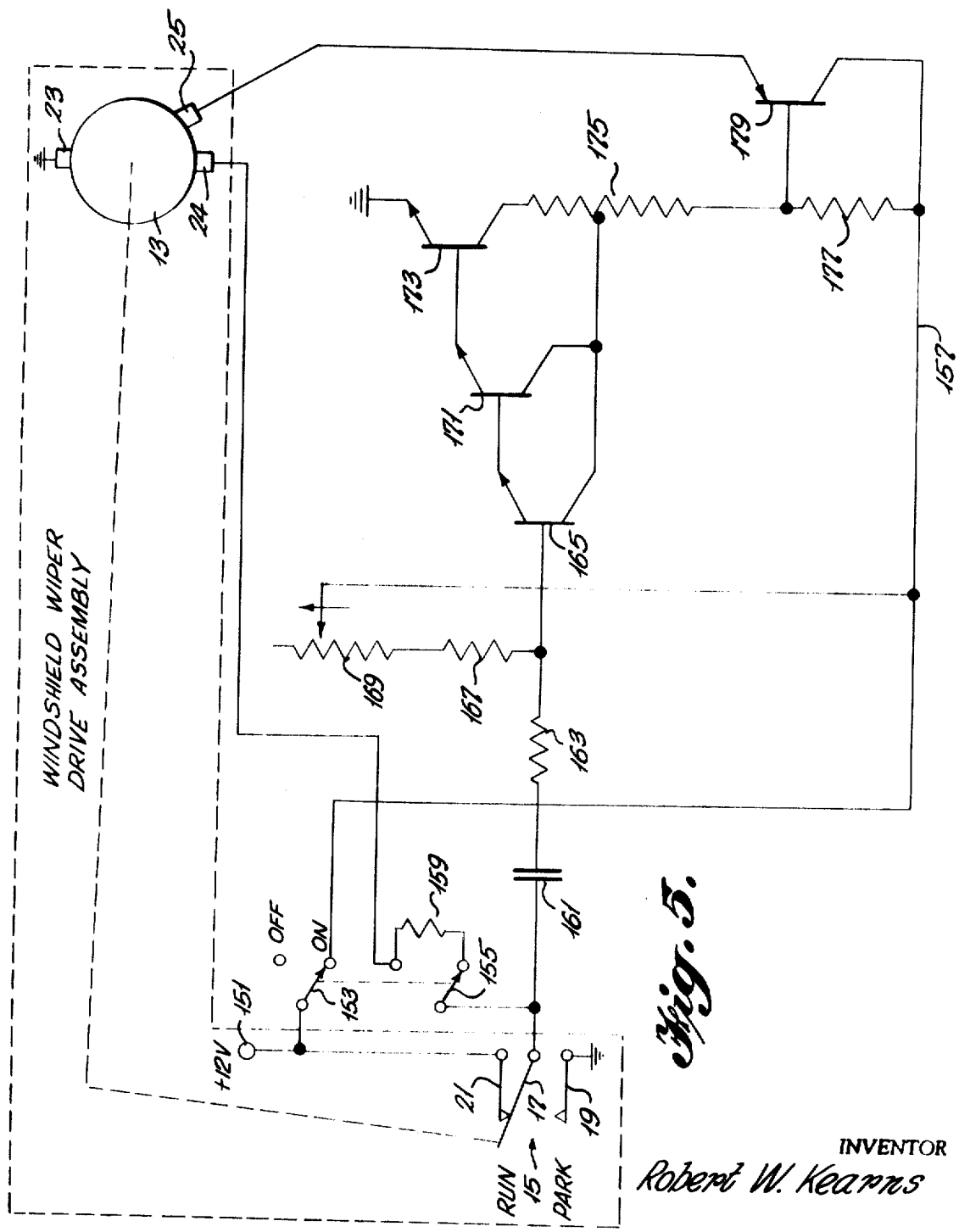

The embodiment of FIG. 5 like that of FIGS. 2 and 3 is designed for only the intermittent mode of operation with continuous operation being provided by adjusting the dwell period at the end of each wipe cycle to be zero. The system of FIG. 5 has the same windshield wiper drive assembly 11 found in the embodiments of FIGS. 1–4 and the corresponding parts of the assembly have been given the same reference numbers in FIG. 5. As in the systems of FIGS. 1–4 the contact 21 of the park switch is connected to plus 12 volts, which is applied to a terminal 151, and the contact 19 is grounded. Likewise, the brush 23 of the motor 13 is grounded as in the other embodiments.

The system of FIG. 5 is controlled by two ganged switches 153 and 155 having two positions, on and off. In the on position the switch 153 connects the plus 12 volts at the terminal 151 to a conductor 157. In the off position the switch 153 is open. In the on position the switch 155 connects the pole 17 of the park switch 15 through a 1-ohm resistor 159 to the low-speed brush 24 of the motor 13. The resistor 159 is preferably a coil of resistance wire. In the off position the switch 155 connects the pole 17 directly to the low-speed brush, bypassing the resistor 159. The pole 17 is connected through a series circuit of a 50 microfarad capacitor 161 and a 4.7-kilohm resistor 163 to the base of an NPN transistor 165. The base of the transistor 165 is also connected through a 4.7kilohm resistor 167 to one side of a 500-kilohm potentiometer 169. The movable tap of the potentiometer 169 is connected to the conductor 157. The other side of the potentiometer 169 is unconnected. The emitter of the transistor 165 is connected to the base of an NPN transistor 171, the emitter of which is connected to the base of an NPN transistor 173. The emitter of the transistor 173 is connected to ground and the collector of the transistor 173 is connected through an 18 ohm resistor 175 and a 5.6-kilohm resistor 177 in series to the conductor 157. The resistor 175 preferably is in the form of a coil resistance wire. The collectors of the transistors 165 and 171 are connected together and to a tap on the resistor 175. The collectors of transistor 165 and 171 are connected to a tap on transistor 175 instead of to the collector of transistor 173 to reduce the power dissipation in transistor 173. The junction between the resistors 175 and 177 is connected to the base of a PNP transistor 179, the collector of which is connected to a high-speed brush 25 of the motor 13 and the emitter of which is connected to a high-speed brush 25 of the motor 13 and the emitter of which is connected to the conductor 157.

When the switches 153 and 155 are in their off position and the wiper blades are at rest in their park position both sides of the capacitor 161 will be at ground potential. Then when the switches 153 and 155 are moved to their on position plus 12 volts will be applied to the conductor 157 and as a result a positive voltage will be applied to the base of the transistor 165 through the resistors 169 and 167 causing the transistor 165 and the transistors 171 and 173 to conduct. As a result current will flow through the resistors 175 and 177 making the base of the transistor 179 negative with respect to the emitter thereof and thus rendering the transistor 179 conductive. As a result the plus 12 volts on conductor 157 will be applied to the high-speed brush 25 and current will flow into the high-speed brush 25 toward the brush 23 and toward the brush 24. Because the resistor 159 is connected in series with the brush 24, more current will flow toward the brush 23 and accordingly the motor 13 will begin to move in a forward direction. As soon as the motor is moved a short distance, the pole 17 will disengage the contact 19 and will engage the contact 21 so that the plus 12 volts will be applied to the low-speed brush 24 through the resistor 159. Accordingly, current will no longer flow from the high-speed brush 25 to the low-speed brush 24 and the motor 13 will drive the wiper blades at high speed through a wipe cycle. While the wiper blades are being driven through a wipe cycle, the side of the capacitor 161 connected to the pole 17 will be connected to the plus 12 volts at the terminal 151 and accordingly this side of the capacitor will be charged to plus 12 volts. The other side of the capacitor 161 will be discharged to ground through the resistor 163 and the conducting transistors 165, 171 and 173.

When the wiper blades have completed a wipe cycle and come into the park position, the pole 17 of the park switch will disengage the contact 21 and will engage the contact 19 causing ground to be applied to the side of the capacitor 161 connected to the pole 17. As a result the other side of the capacitor 161 will be driven to minus 12 volts causing a minus voltage to be applied to the base of the transistor 165. This minus voltage at the base of the transistor 165 will turn the transistor 165 and the transistors 171 and 173 off. Accordingly, current will no longer flow through the resistors 175 and 177 and the transistor 179 will be turned off. In addition, when the pole 17 of the park switch engages the contact 19, the 1 ohm resistor 159 will be connected between the brushes 23 and 24 of the motor 13 so that the motor 13 will be electrodynamically braked to a stop. The capacitor 161 will then begin to charge from the conductor 157 through the potentiometer 169 and the resistors 167 and 163. When the charge of the capacitor 161 becomes positive, the transistors 165, 171 and 173 will be turned on causing the transistor 179 to again turn on. The motor 13 will then again begin to move the wiper blades and the pole 17 will disengage from the contact 21 and will again engage the contact 19. Thereupon the wiper blades will again be driven at high speed through a wipe cycle and the process will be repeated.

Thus, the system of FIG. 5 will drive the wiper blades through a wipe cycle with a dwell period at the end of each wipe cycle. The length of the dwell period can be adjusted by varying the setting of the potentiometer 169, which will vary the rate at which the capacitor 161 will charge. If it is desired for the wiper blades to operate continuously, the movable tap potentiometer 169 is moved toward the end connected to the base of the transistor 165 so that the dwell period at the end of each wipe cycle is zero and the wiper blades operate continuously.

If it is desired for the wiper blades to automatically skip the dwell period at the end of each wipe cycle in response to the wetness of the windshield, the resistance 159 is made larger to reduce the electrodynamic braking on the motor 13. With the reduced braking, the inertia of the wiper blades on a relatively wet windshield will overcome the braking force and the wiper blades will move through the region in which the contact 17 engages the contact 19 before the braking force can bring the motor to a stop. As a result, the motor 13 will proceed through another wipe cycle without stopping and will skip the dwell period in response to the windshield being relatively wet.

When the switches 153 and 155 are moved to the off position, the plus 12 volts will be disconnected from the conductor 157 thus deenergizing the high-speed brush 25. Plus 12 volts will be applied directly to the low-speed brush 24 from the terminal 151 through the pole of the park switch 17 and the switch 155. Accordingly, the motor 13 will drive the wiper blades at low speed until the park switch 17 engages the contact 19 whereupon full electrodynamic braking will be applied to the motor 13 and the motor will stop the wiper blades precisely at the desired park position.

The circuit of FIG. 5 has an advantage over the circuit of FIGS. 1, 3 and 4 because the voltage drop across the output transistor in series with the high-speed brush is minimized in this circuit. In the other circuits, the additional transistor connected between the collector and base of the output transistor adds to the voltage drop across the output transistor and therefore reduces the motor speed. The circuit of FIG. 5 has the same number of stages of amplification but the voltage drop across the output transistor is reduced to that contributed by the output transistor itself. Accordingly higher motor speed is provided. Also the power dissipated in the output transistor under stall conditions is reduced.

The above description is of preferred embodiments of the invention and many modifications may be made thereto without departing from the spirit and scope of the invention.

What is claimed is:

1. A windshield wiper system for automotive vehicle comprising a DC motor connected to drive at least one windshield wiper blade through wipe cycles on an automotive vehicle windshield, said motor having three brushes positioned so that the greater portion of said armature winding is energized when voltage is applied between a first pair of said brushes than is energized when voltage is applied between a second pair of said brushes so that said motor will run at a higher speed when energized between said second pair of brushes, motor control means having first and second conditions energizing said motor in said first condition between said second pair of brushes to drive said wiper blade through repeated wipe cycles and in said second condition energizing said motor between said first pair of brushes to drive said wiper blade at a low speed to a predetermined park position and to electrodynamically brake said motor to a stop at said park position by closing a circuit between said first pair of brushes ceasing any further wipe cycles while said motor control means is in said second condition, said motor control means in said first condition closing a circuit between said second pair of brushes each time said wiper blade comes into a predetermined region of said wipe cycle to electrodynamically brake said motor with a force less than that applied to said motor by said motor control means in said second condition when said motor is brought to a stop in said park position, said force being sufficient to bring said motor to a stop in said wipe cycle region in which the circuit is closed between said second pair of brushes if said wiper blade is moving relatively slowly as result of wiping over a relatively dry windshield, said motor control means including means operable when said motor control means is in said first condition and said motor is stopped by said braking force in said wipe cycle region to energize said motor after a time delay to start another wipe cycle, and a switch control movable between first and second positions to place said motor control means selectively in said first condition or said second condition.

2. A windshield wiper system for automotive vehicles comprising a DC motor connected to drive at least one windshield wiper blade through wipe cycles on an automotive vehicle windshield, said motor having three brushes positioned so that the greater portion of said armature winding is energized when voltage is applied between a first pair of said brushes than is energized when voltage is applied between a second pair of said brushes so that said motor will run at a higher speed when energized between said second pair of brushes, motor control means having first and second conditions energizing said motor intermittently only in said first condition between said second pair of brushes to drive said wiper blade through repeated wipe cycles with a dwell period in which the wiper blades are stopped automatically near a predetermined park position at the end of each wipe cycle and in said second condition energizing said motor between said first pair of brushes to drive said wiper blade at a low speed to said predetermined park position and to stop said motor and said wiper blade at said park position ceasing any further wipe cycles while said motor control means is in said second condition, and a switch control movable between first and second positions to place said motor control means selectively in said first condition or said second condition.

3. A windshield wiper system as recited in claim 2 wherein said motor control means includes means to vary the length of said dwell period.

4. A windshield wiper system as recited in claim 2 wherein said motor control means includes transistor switch means connected in series with said second pair of brushes, and timing means to render said transistor switch means conductive between said dwell periods and nonconductive during said dwell periods.

5. A windshield wiper system as recited in claim 4 wherein said timing means includes a capacitor and a circuit for charging said capacitor during said dwell periods to determine the duration of said dwell periods.

6. A windshield wiper system as recited in claim 2 wherein said motor control means has a third condition in which said motor control means will energize said motor between said second pair of brushes to drive said motor continuously at a high speed through repeated wipe cycles, said switch control being movable to a third position to place said motor control means in said third condition.

7. A windshield wiper system as recited in claim 6 wherein said motor control means includes means to selectively vary the speed of said motor in said third condition.

8. A windshield wiper system as recited in claim 7 wherein said motor control means includes means to regulate the speed of said motor to maintain the speed relatively constant under varying loads in said third condition.

9. A windshield wiper system for automotive vehicle comprising a DC motor connected to drive at least one windshield wiper blade through wipe cycles on an automotive vehicle windshield, said motor having three brushes so that the greater portion of said armature winding is energized when voltage is applied between a first pair of said brushes than is energized when voltage is applied between a second pair of said brushes so that said motor will run at a higher speed when energized between said second pair of brushes, motor control means having first and second conditions and energizing said motor between said first pair of brushes in said first condition and energizing said motor between said second pair of brushes in said second condition, said motor control means in only one of said first and second conditions being operable to energize said motor intermittently to drive said wiper blade through repeated wipe cycles with a dwell period occurring automatically at the end of each of said wipe cycles, and a switch control movable between first and second positions to place said motor control means in said first condition or in said second condition.

10. A windshield wiper system as recited in claim 9 wherein said motor control means electrodynamically brakes said motor to a stop at the start of each of said dwell periods.

11. A windshield wiper system as recited in claim 9 wherein said motor control means includes means to vary the length of said dwell period.

12. A windshield wiper system as recited in claim 9 wherein said motor control means has a third condition in which said motor control means will energize said motor between said second pair of brushes to drive said motor continuously at a high speed through repeated wipe cycles and wherein said switch control is movable to a third position to place said motor control means in said third condition.

13. A windshield wiper system as recited in claim 9 wherein said motor control means comprises a capacitance, a resistance, a circuit connected to vary the charge on said capacitance by current flowing through said resistance during said dwell period, and means responsive to the charge on said capacitor reaching a predetermined level to energize said motor to end said dwell period.

14. A windshield wiper system as recited in claim 13 wherein said means responsive to the charge in said capacitance reaching a predetermined level to energize said motor comprises a solid state electronic valve connected in a circuit to become conductive when said capacitance reaches said predetermined level and means responsive to said electronic valve becoming conductive to energize said motor.

15. A windshield wiper system for automotive vehicles comprising a DC motor connected to drive at least one windshield wiper blade through wipe cycles on an automotive vehicle windshield, said motor having three brushes positioned so that the greater portion of said armature winding is energized when voltage is applied between a first pair of said brushes than is energized when voltage is applied between a second pair of said brushes so that said motor will run at a higher speed when it is energized between said second pair of brushes, motor control means for energizing said motor intermittently between one of said pairs of brushes to drive said wiper blade through repeated wipe cycles deenergizing said motor at the end of each of said wipe cycles, said motor control means including means to automatically close a circuit across the other of said pairs of brushes at the end of each of said wipe cycles to electrodynamically brake said motor at the end of each of said wipe cycles.

16. A windshield wiper system as recited in claim 15 wherein said means to close a circuit across said other of said pairs of brushes electrodynamically brakes said motor to a stop at the end of each wipe cycle.

17. A windshield wiper system as recited in claim 15 wherein said motor control means energizes said motor intermittently across said second pair of brushes and wherein said braking means closes said circuit across said first pair of brushed to electrodynamically brake said motor.

18. A windshield wiper system for automotive vehicles comprising a DC motor connected to drive at least one windshield wiper blade through wipe cycles on an automotive vehicle windshield, said motor having three armature brushes, motor control means to energize said motor between a first pair of said brushes except when said wiper blade is in a predetermined start portion to drive said wiper blade to said start position and to automatically connect a current path across said first pair of brushes to electrodynamically brake said motor when said wiper blade reaches said start position, and means to automatically energize said motor between a second pair of brushes after a dwell period commencing when said motor has been braked to a stop at said start position by said motor control means to drive said motor out of said start position.

19. A windshield wiper system as recited in claim 18 wherein a greater portion of said armature winding is energized when voltage is applied between said second pair of brushes than is energized when voltage is applied between said first pair of brushes so that said motor will run at a higher speed when it is energized between said first pair of brushes.

PO-1050
(5/69)

UNITED STATES PATENT OFFICE
CERTIFICATE OF CORRECTION

Patent No. 3,602,790  Dated August 31, 1971

Inventor(s) Robert W. Kearns

It is certified that error appears in the above-identified patent and that said Letters Patent are hereby corrected as shown below:

Column 1, after line 1, read --Cross-Reference to Related
       Applications--.
Column 4, line 73, "resistor" should read --transistor--.
Column 5, line 13, "high-speed" should read --low-speed--.
Column 11, line 75, "he" should read --the--.
Column 12, line 39, "kilohm" should read --ohm--;
       lines 49-51 should read --high-speed brush
       25 of the motor 13 and the emitter of which
       is connected to the conductor 157.--
Column 13, line 24, "of" should read --on--.
Column 14, line 34, "as result" should read --as a result--.
Column 16, line 35, "brushed" should read --brushes--;
       line 42, "portion" should read --position--.

Signed and sealed this 20th day of November 1973.

(SEAL)
Attest:

WARD M. FLETCHER, JR.          RENE D. TEGTMEYER
Attesting Officer              Acting Commissioner of Patents